(12) United States Patent
Yamazaki

(10) Patent No.: US 7,351,365 B2
(45) Date of Patent: Apr. 1, 2008

(54) SOLUTION FILM-FORMING METHOD, PROTECTIVE FILM OF POLARIZING PLATE, OPTICAL FUNCTIONAL FILM, POLARIZING PLATE, AND LIQUID CRYSTAL DISPLAY DEVICE

(75) Inventor: Hidekazu Yamazaki, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 233 days.

(21) Appl. No.: 10/368,479

(22) Filed: Feb. 20, 2003

(65) Prior Publication Data

US 2003/0155558 A1    Aug. 21, 2003

(30) Foreign Application Priority Data

Feb. 20, 2002    (JP)    ............... 2002-043088

(51) Int. Cl.
*B29C 39/14*    (2006.01)
(52) U.S. Cl. .................... 264/216; 264/217
(58) Field of Classification Search ............... 264/1.31, 264/216, 217
See application file for complete search history.

(56) References Cited

U.S. PATENT DOCUMENTS

| | | | |
|---|---|---|---|
| 2,318,469 A * | 5/1943 | Derby et al. ................. | 264/212 |
| 2,607,704 A | 8/1952 | Fordyce et al. | |
| 5,663,310 A * | 9/1997 | Shimoda et al. .............. | 536/69 |
| 6,368,534 B1 * | 4/2002 | Nakamura et al. .......... | 264/216 |
| 2002/0149725 A1 * | 10/2002 | Hashimoto ................... | 349/117 |
| 2003/0148134 A1 * | 8/2003 | Ono et al. ................... | 428/534 |

FOREIGN PATENT DOCUMENTS

| | | |
|---|---|---|
| JP | 62-43846 | 9/1987 |
| JP | 5-185445 | 7/1993 |
| JP | 9-207194 | 8/1997 |
| JP | 9-207195 | 8/1997 |
| JP | 9-225953 | 9/1997 |
| JP | 10-6351 | 1/1998 |
| JP | 11-80381 | 3/1999 |
| JP | 11-124445 | 5/1999 |
| JP | 11-221833 | 8/1999 |
| JP | 11-248940 | 9/1999 |
| JP | 2000-95877 | 4/2000 |
| JP | 2001-71338 | 3/2001 |
| JP | 2001-113525 | 4/2001 |

* cited by examiner

*Primary Examiner*—Mathieu D. Vargot
(74) *Attorney, Agent, or Firm*—Young & Thompson

(57) ABSTRACT

A solution film-forming method for obtaining the polymer film includes discharging a pressurized polymer solution having a specific temperature from a casting die, casting the polymer solution on a support, solidifying the polymer solution to form a film, peeling and drying the film, wherein the polymer solution to be cast on the support is mixed with a specific solvent such that $E1/n$ is larger than 0.1 (1/second) and smaller than 3.0 (1/second) when the dynamic modulus of rigidity and dynamic coefficient of viscosity of the polymer solution immediately after discharged on the support from the casting die are $E1$ (Pascal) and $n$ (Pascal·second), respectively.

15 Claims, 7 Drawing Sheets

SOLUTION FILM-FORMING METHOD, PROTECTIVE FILM OF POLARIZING PLATE, OPTICAL FUNCTIONAL FILM, POLARIZING PLATE, AND LIQUID CRYSTAL DISPLAY DEVICE

BACKGROUND OF THE INVENTION

1. Field of the Invention

The present invention relates to a solution film-forming method for use in manufacturing films for photosensitive materials and optical applications, and a protective film of a polarizing plate, an optical functional film, a polarizing plate and a liquid crystal display device constituted by using the polymer film formed by the solution film-forming method.

2. Description of the Related Art

In recent years, in transparent films, the demand for optical materials such as a protective film of a polarizing plate for a liquid crystal display device, an optical compensation film such as a phase difference plate, a transparent substrate and an optical filter has grown in addition to the conventional demand for a photo support or an overhead transparency, which has been increasing the severity of quality demands for the transparent film.

In particular, a plastic film for optical materials such as a protective film of a polarizing plate needs to have high transparency, low optical anisotropy, planarity, easiness of surface treatment, high durability and scratch resistance.

Plastic films with these characteristic properties include a cellulose ester, a norbornene resin, an acrylic resin, a polyacetate resin and a polycarbonate resin, and cellulose ester is mainly used from the view points such as productivity and a material price. In particular, cellulose triacetate (TAC) is advantageously used for its high transparency, low optical anisotropy and low retardation.

A cellulose acetate film is generally manufactured by a solution film-forming method including the steps of casting a polymer liquid (dope), which has a polymer dissolved in an organic solvent, on a support comprising a surface-cooled drum or an endless band from a casting die, cooling and drying it on the support, peeling a solidified film from the support and drying it while conveying it with rolls or tenters.

A method for facilitating gelation of the dope to shorten the time of the peeling from the support by adding a poor solvent to a main solvent has been proposed in order to increase the production speed of the film by this solution film-forming method and improve the production efficiency (such as U.S. Pat. No. 2,607,704 class).

However, since the boiling point of the poor solvent to be used is generally high, it takes time to dry the film after peeling and the total production time of the film will remain unchanged. There may be a method for casting a dope having a higher concentration on the support in order to decrease the load for drying. Higher concentration of the dope, however, could generate melt fracture, which can extremely reduce the quality of the surface condition of the film.

Melt fracture is a phenomenon in which irregular unevenness is formed on the film surface or gloss of the surface is lost. The cause of the melt fracture is assumed that a large shear stress of a dope flow can disturb the flow state of the dope at a flow inlet to a die to prevent the flow from forming a parallel flow, or that a dead space can be formed in a dope flow path inside the die when relaxation of the internal stress takes time due to a too-high dope viscosity.

A method for preventing occurrence of the melt fracture is disclosed in Japanese Patent Publication No. 62-43846 in which both high- and low-viscosity solutions are simultaneously extruded from a die slit in such a manner that the high-viscosity polymer solution is enveloped by the low-viscosity solution to reduce the shear stress inside the die slit to a threshold value or below.

On the other hand, when the content of an organic solvent at the peeling of the film from the support exceeds a specific value, unstable conveying such as a sag or flapping of a peeled film from the support in conveying means could occur as the film is soft, resulting in the problem of failures of the surface condition such as scratches, knicks and wrinkles.

To solve this problem, the film needs to be conveyed under an appropriate tension. However, if the content of an organic solvent exceeds a specific value, the tension could shrink the film. Therefore, Japanese Patent Laid-Open No. 5-185445 discloses a method for applying tension to the film while it is subjected to dry air within a certain temperature range for a certain period of time after the film is peeled from the support.

On the other hand, in a drying step for drying a film while conveying it with rolls or tenters, there may be a problem of occurrence of continuous wrinkles (stringiness) in the conveying direction of the film if the drying temperature is high in order to increase the production speed of the film.

In order to improve the stringiness formed in the conveying direction of the film, there may be a method for providing a planarity-improving step comprising a heating step by a heating roll and a cooling step by a cooling roll as a downstream step of the drying step. However, a plasticizer in the film precipitated on the heating roll can adhere to the film as a thin film or form a spot pattern on the film.

Japanese Patent Laid-Open No. 9-225953 discloses a method for imparting a cationic or anionic polymer to avoid precipitation of the plasticizer or formation of the spot pattern when applying a film upstream the planarity-improving step.

However, streak defects caused by a nonuniform thickness in the casting direction can be formed also by the conditions when casting the dope on a support from a die.

Japanese Patent Laid-Open No. 9-207194 and No. 9-207195 disclose methods for preventing the streak defects by R-processing of the tip of die lips. Furthermore, Japanese Patent Laid-Open No. 2001-71338 discloses a method for preventing the streak defects by limiting the stretching stress applied to the ribbon-shaped dope at the tip of the die lips or the pin angle of the ribbon-shaped dope.

In addition, when an additive liquid such as methanol or butanol is mixed with a liquid to be added such as a cellulose ester or an organic solvent, uniform dispersion and mixing of the additive liquid with the liquid to be added depend on the viscosity ratio, flow volume ratio and the like of these fluids. Thus, the nonuniform thickness of the film is influenced also by the dispersibility of the mixture.

Japanese Patent Laid-Open No. 2001-113525 discloses a method for adjusting a polymer solution to uniformly disperse and mix an additive liquid with a liquid to be added by restraining generation of pulsation in the additive liquid by bringing the ratio of flow rate of the additive liquid and the liquid to be added at a converging section within a specific range.

By using these methods, it is possible to restrain the thickness distribution of a cellulose acetate film in a lateral direction and a longitudinal direction at least 0.5% or below.

However, a radical improvement of flowability of the polymer liquid cast from a casting die is difficult only by the improvement of the structure of the casting die such as disclosed in Japanese Patent Laid-Open No. 9-207194, No. 9-207195, and No. 2001-71338. Furthermore, since the polymer solution containing a cellulose ester and the like is fundamentally a viscoelastic body and has elastic properties, it is necessary to take dynamic viscosity and dynamic modulus into account. In addition, for the films for optical applications requiring homogeneous control of the surface condition such as a polarizing plate for a liquid crystal display device and the like, a phase difference plate and an optical compensation film, the demands for the quality of the surface condition tend to be increasingly severe.

SUMMARY OF THE INVENTION

In view of the above described circumstances, it is an object of the present invention to provide a solution film-forming method that facilitates control of the quality of the surface condition of a polymer film by revealing the optimum ranges regarding the physical properties or the like of a polymer solution and preferable peeling conditions to enhance the quality of the surface condition of the polymer film manufactured by the solution film-forming method.

Another object of the present invention is to provide a protective film of a polarizing plate, an optical functional film, a polarizing plate and a liquid crystal display device having good optical properties using the above described polymer film.

The present invention provides a solution film-forming method for obtaining a polymer film comprising discharging a pressurized polymer solution from a casting die, casting the polymer solution on a support, solidifying the polymer solution to form a film on the support, peeling the film from the support and drying the film, wherein the polymer solution to be cast on the support is mixed with a specific solvent such that $E1/n$ is larger than 0.1 (1/second) and smaller than 3.0 (1/second) when the dynamic modulus of rigidity and dynamic coefficient of viscosity of the polymer solution discharged on the support from the casting die are $E1$ (Pascal) and n (Pascal·second), respectively.

The present invention has been created based on the following knowledge: the polymer solution used for the polymer film formed by a solution film-forming method fundamentally has elasticity in addition to viscosity and so the polymer solution pulses a little when discharging the polymer solution from a casting die and casting on a support to implement the solution film-forming method, so that for more closely controlling the surface condition of a polymer film, interpreting physical properties of the polymer solution as dynamic properties can result in better agreement with the realities. Therefore, it is possible to improve planarity or the like of the film when the polymer solution is cast on the support by using the solution film-forming method according to the present invention.

Furthermore, the present invention includes a manufacturing process for co-casting two or more kinds of polymer solutions in a casting step in the solution film-forming method.

In addition, the present invention also includes a protective film of a polarizing plate, an optical functional film, a polarizing plate and a liquid crystal display device comprising the polymer film formed by the solution film-forming method according to the present invention.

In accordance with the solution film-forming method of the present invention, a polymer film having a good surface condition can be manufactured in a stable condition and at high speed, by controlling the mixing of a polymer solution and by controlling the cooling temperature of the support, based on optimum physical properties of the polymer solution and preferable peeling conditions for manufacturing a polymer film having good quality of the surface condition by a solution film-forming method. In addition, a protective film of a polarizing plate, an optical functional film, a polarizing plate and a liquid crystal display device having good optical properties can be provided using the polymer film formed by the solution film-forming method according to the present invention.

DETAILED DESCRIPTION OF THE PREFERRED EMBODIMENTS

Embodiments of the solution film-forming method of the present invention will now be described below.

In the solution film-forming method of the present embodiments, the apparatus for manufacturing the polymer film employs either a casting band or a casting drum for the support for casting a polymer solution. First, these polymer film manufacturing apparatuses will be described.

Figure 1:
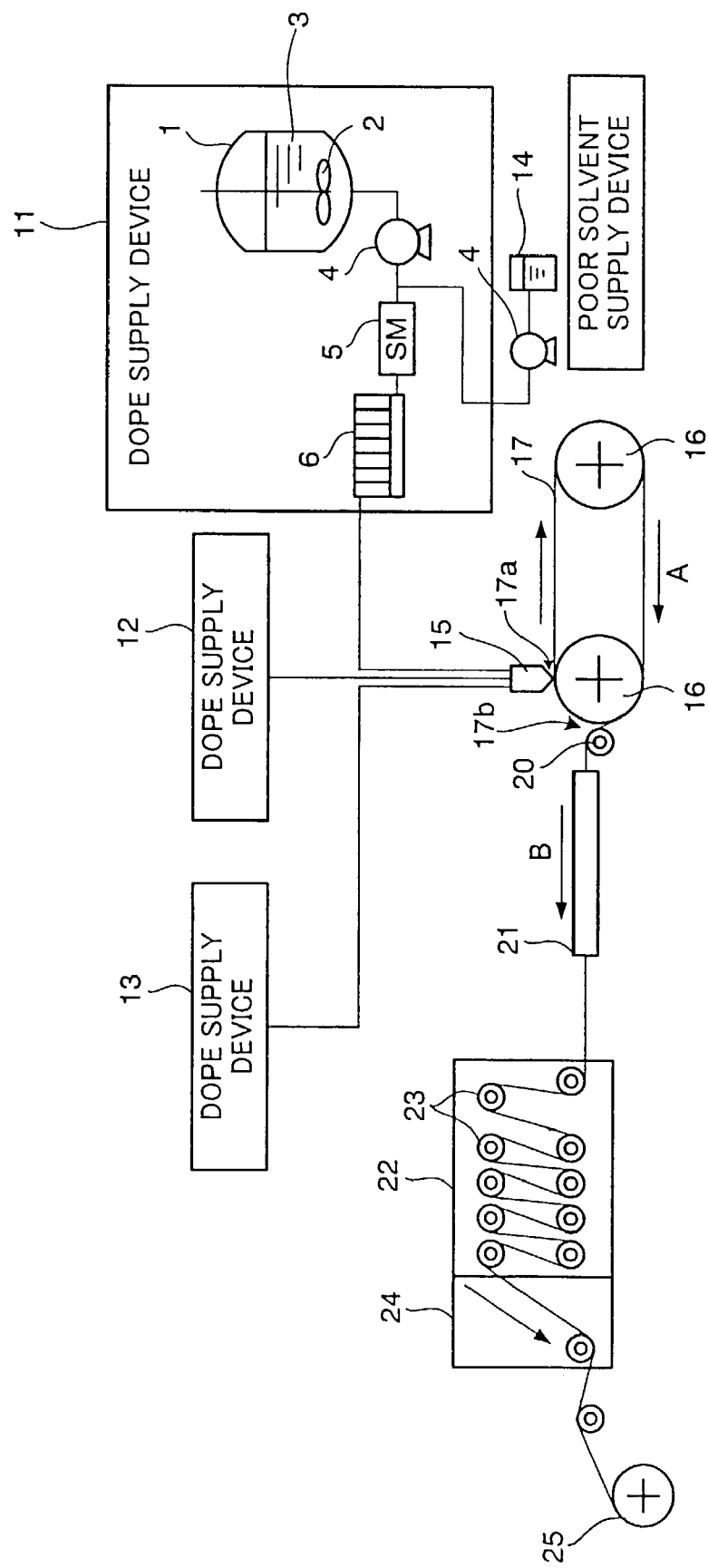
FIG. 1 illustrates a manufacturing apparatus using a casting band for the support in the apparatuses for manufacturing a polymer film for use in the present embodiments.

FIG. 1 illustrates a manufacturing apparatus using a casting band for the support in the apparatuses for manufacturing a polymer film for use in the present embodiments.

The manufacturing apparatus of the present embodiment shown in FIG. 1 has three dope supply devices for supplying different types of dope. A first dope supply device 11 comprises a storage tank 1 having an agitating blade 2 for agitating a thermally-dissolved dope 3 therein, a delivery pump 4 for delivering the dope 3 agitated in the storage tank 1 under a specific pressure, a static mixer 5 for obtaining a polymer solution having a specific formulation by mixing a poor solvent supplied from a poor solvent supply device 14 for supplying the poor solvent such as butanol through the delivery pump 4 with the delivered dope, and a filter 6 for removing impurities. These devices are combined by delivery pipes for delivering the polymer solution.

The dope 3 is mixed with the poor solvent such as butanol for obtaining a desired gel strength when peeling the film from a casting belt 17, which film is formed by casting and solidifying the polymer solution on the belt 17. The static mixer 5 is effectively used for reducing the viscoelasticity by continuously mixing a certain amount of the poor solvent such as butanol with the dope.

Furthermore, when mixing a poor solvent with the dope, the time required after obtaining a final formulation of the polymer solution by heating and mixing the poor solvent in the static mixer 5 until discharging the polymer solution on the casting belt 17 is preferably within 10 minutes or less for avoiding a detrimental effect of the poor solvent on the dope.

In the present embodiments, a specific amount of a specific poor solvent is mixed with the polymer solution such that E1/n is within the range larger than 0.1 (1/second) and smaller than 3.0 (1/second), and the dynamic coefficient of viscosity is within in the range higher than 20 (Pascal·second) and lower than 200 (Pascal·second), when the dynamic modulus of rigidity and dynamic coefficient of viscosity of the dope at the temperature immediately after casting the dope adjusted in a final formulation on the casting die are E1 (Pascal) and n (Pascal·second), respectively.

Thus, the dynamic modulus of rigidity and dynamic coefficient of viscosity are taken into account from the following knowledge that has been obtained: the polymer solution fundamentally has elasticity in addition to viscosity, and the polymer solution looks to pulse a little when discharging the polymer solution on the casting belt 17, so that for more closely controlling the surface condition of a polymer film, interpreting physical properties of the polymer solution as dynamic properties can result in better agreement with the realities.

A second and third dope supply devices 12 and 13 comprise a storage tank 1 having an agitating blade 2 for agitating a thermally-dissolved dope therein, a delivery pump 4 for delivering the dope agitated in the storage tank 1 under a specific pressure, but a poor solvent supply device 14 is not combined with the delivery pipes.

In FIG. 1, the first to third dope supply devices 11, 12 and 13 comprise a respective storage tank 1. However, all of the dope supply devices need not comprise the storage tank 1, but a common storage tank 1 may be provided. A branch pipe for diverting the dope may be provided at some midpoint in a delivery pipe for delivering the dope from the common storage tank 1 to a next step so as to be adapted to supply the dope to other dope supply devices through the branch pipe. A dilution solvent supply device may also be connected to the branched delivery pipe to supply a diluted polymer solution. The dope supply devices need not be provided in three, but may be one or two.

The dope supplied from each of the dope supplying devices 11, 12 and 13 is pressurized by the delivery pump 4 to be sent to a casting die 15. A surface layer dope for forming a surface layer of the film is delivered from the first dope supply device 11; a base layer dope for forming a center portion of the film is delivered from the second dope supply device 12; and a back layer dope for forming a back layer of the film is delivered from the third dope supply device 13. These are combined at the die 15 and then discharged to be cast on the casting band 17.

The highest pressure in the piping for delivering the polymer solution through the piping is preferably from 5 (kg/cm$^2$) to 40 (kg/cm$^2$). The temperature of the polymer solution when discharged from the casting die is preferably from 10° C. to 55° C.

The dynamic modulus of rigidity and dynamic coefficient of viscosity can be adjusted within more appropriate ranges by pressurizing and heating the polymer solution in such ranges.

The present embodiments are adapted to discharge each dope to be delivered to the casting die 15 by pressurizing with the delivery pump 4, but are not limited to this. A pressure reducing chamber may be provided in a rear position of the casting die 15 and the dope may be absorbed to the casting band side by reducing the pressure in a casting section by the pressure reducing chamber. A co-casting die is used for the casting die 15 here, but is not limited to. The structure of the casting die 15 will be described below.

The casting band 17 is an endless band with a mirror polished surface running on a pair of rotating drums 16 and circulating in the direction of the arrow A. The casting die 15 is disposed above the peripheral surface of one of the rotating drums 16 with a small distance from the peripheral surface. The polymer solution pressurized by the delivery pump 4 is discharged from the casting die 15, cast to be extended over the casting band 17 running in the direction of the arrow A and cooled by the cooling air blown over the belt surface during running to be solidified to form a film. The film is then peeled at a peeling roll 20 after the casting band 17 has circulated approximately one rotation, and the peeled film is sent in the direction of the arrow B through a roll conveying zone 21.

The polymer solution cast from the casting die 15 has a higher temperature at the casting point 17a cast on the support such as the casting band 17 of 10° C. to 55° C. However, in order to solidify the polymer solution to form a film while running to a specific peeling point 17b and peel the film at the peeling point 17b, the temperature at the peeling point 17b is preferably lower, that is, from −30° C. to 30° C. In order to facilitate the peeling and shorten the time from the casting to the peeling, the temperature difference between the casting point 17a and the peeling point 17b needs to be large. However, if the temperature difference exceeds 50° C., the solidified film could shrink to form curl. Some history of the curl can remain even if a downstream step for correcting the curl is provided. If the temperature difference is 5° C. or less, the cooling speed of the polymer solution discharged on the casting belt 17 could be slow. In this case, air bubbles could be formed in the film by expansion of very small amount of air in the polymer solution due to the pressure difference between the internal pressure of the polymer solution after liberated from pressure and the surrounding atmospheric pressure. Consequently, the difference of the temperature at the casting point 17a and the peeling point 17b needs to be within the range from 5° C. to 50° C.

The film peeled from the casting band 17 and conveyed through the roll conveying zone 21 is sent to a drying zone 22 to be dried during running on a plurality of rolls 23, cooled to room temperature through a cooling zone 24 and wound with a winding machine 25.

The dynamic modulus of rigidity of the film when peeling the film from the casting belt 17 preferably exceeds 20,000 Pa in order to prevent occurrence of nonuniform thickness of the film when stretched by the tension for peeling the film. The thickness t of the film is, but not limited to, preferably 20 to 500 μm, more preferably 30 to 300 μm and most preferably 35 to 200 μm.

Figure 2:
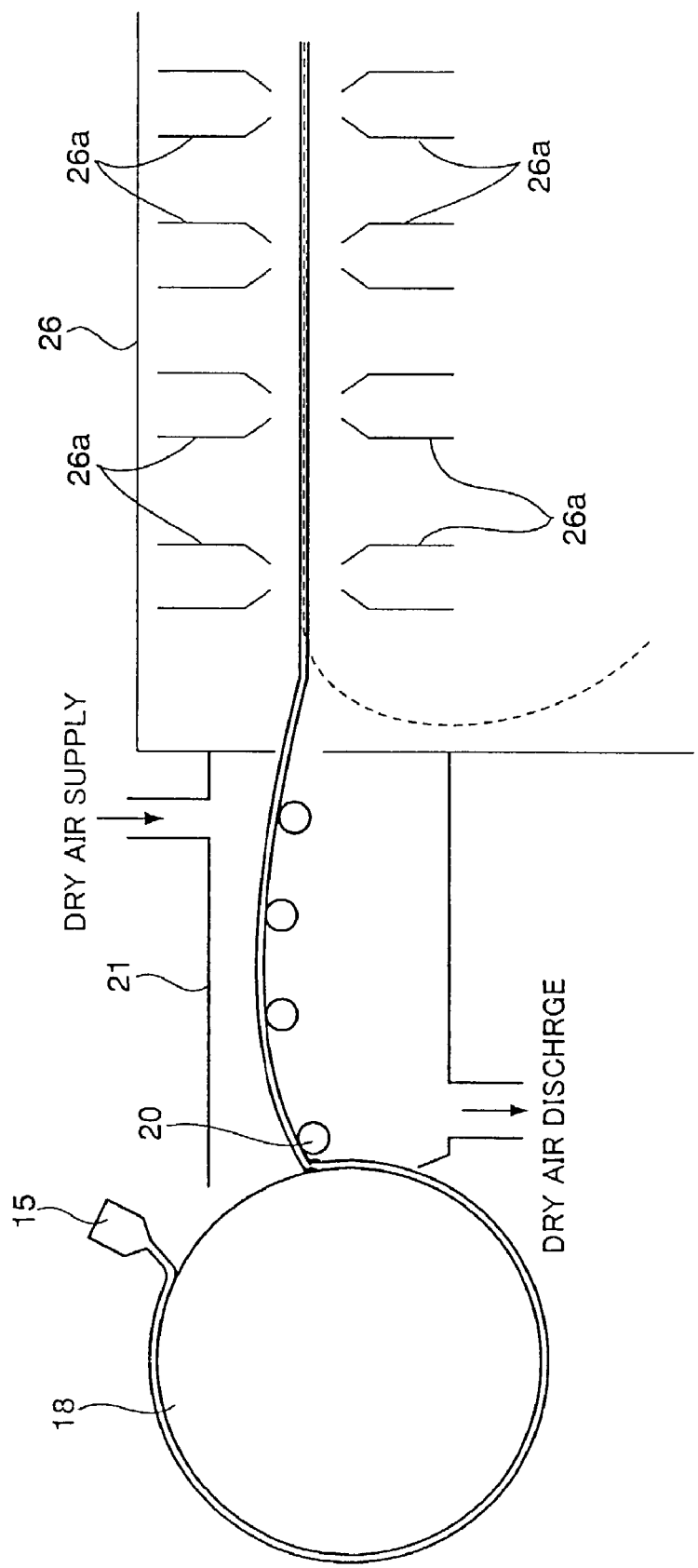
FIG. 2 illustrates a part of a manufacturing apparatus using a drum for the support in the apparatuses for manufacturing a polymer film of the present embodiments.

FIG. 2 illustrates a part of a manufacturing apparatus using a drum for the support in the apparatuses for manufacturing a polymer film of the present embodiments.

The apparatus for manufacturing a polymer film illustrated in FIG. 2 employs a casting drum 18 as a substitute for the casting band 17 illustrated in FIG. 1. The casting band 17 can provide a longer cooling time than the casting drum 18, so that the gelation can be facilitated by using a poor solvent having a higher boiling point. However, there is a limitation in increasing the production speed. On the other hand, the casting drum 18 is capable of positively cooling the casting drum 18 itself, so that it has the advantage that the production speed can be increased by a combination of facilitation of both gelation and cooling.

The dope is mixed with a poor solvent such that E1/n is larger than 0.1 (1/second) and smaller than 3.0 (1/second) when the dynamic modulus of rigidity and dynamic coefficient of viscosity of the polymer solution immediately after discharged on the casting drum 18 from the casting die 15 are E1 (Pascal) and n (Pascal·second), respectively; the dynamic coefficient of viscosity n is higher than 20 (Pascal·second) and lower than 200 (Pascal·second); the dynamic modulus of rigidity E2 of the solidified film when peeling the film on the casting drum 18 is higher than 20,000 (Pascal); the polymer solution is adjusted to the final formulation with the static mixer 5 within ten minutes prior to be discharged from the casting die 15; the polymer solution delivered through piping has the highest pressure in the piping of from 5 (kg/cm$^2$) to 40 (kg/cm$^2$); the temperature of the polymer solution when discharging the polymer solution on the casting drum 18 from the casting die 15 is from 10° C. to 55° C.; the temperature difference between the temperature of the casting die 15 when discharging the polymer solution on the casting drum 18 from the casting die 15 and the temperature of the casting drum 18 when the film solidified on the casting drum 18 is peeled from the casting drum 18 is larger than 5° C. and smaller than 50° C.; and the temperature of the casting drum 18 when peeling the film from the casting drum 18 is from minus 30° C. to 30° C. The above points are common to both of the casting band 17 and the casting drum 18.

Furthermore, in the above described manufacturing apparatus using a drum for a support, the film peeled at a peeling roll 20 is conveyed while being dried with dry air through a specific roll conveying zone 21, and then sent to a tenter conveying zone 26 for drying the film while stretch-conveying the film by gripping it at both edges with tenters 26a.

The dope for use in the present embodiments will now be described.

The dope includes cellulose esters, a polycarbonate and the like. Cellulose esters typically include lower fatty acid esters of cellulose (for example, cellulose acetate, cellulose acetate butyrate and cellulose acetate propyonate). Lower fatty acid means the fatty acid having 6 or less carbon atoms. Cellulose acetate includes cellulose triacetate (TAC) and cellulose diacetate (DAC). In particular, in the present invention, the dope is preferably prepared from a solution of cellulose acylate, and the cellulose acylate is more preferably cellulose triacetate.

The solvent used for the dope generally includes chlorides of lower aliphatic hydrocarbons and lower aliphatic alcohols. Examples of lower aliphatic hydrocarbons include methylene chloride and chloroform. Examples of lower aliphatic alcohols include, but are not limited to, alcohols having from 1 to 6 carbon atoms such as methanol, ethanol, n-propanol, iso-propanol, 1-butanol, t-butanol, 2-methy-2-butanol, 2-methoxy ethanol and 2-butoxy ethanol. Examples of other solvents include, but are not limited to, ketones such as acetone substantially containing no halogenated hydrocarbon, for example, ketones having carbon atoms from 4 to 12 such as methyl ethyl ketone, diethyl ketone, diisobutyl ketone, cyclohexanone and methyl cyclohexanone. In addition, esters having carbon atoms from 3 to 12 may also be used, which include, for example, but are not limited to, ethyl formate, propyl formate, pentyl formate, methyl acetate, ethyl acetate, propyl acetate, butyl acetate, pentyl acetate and 2-ethoxy-ethyl acetate. Further, ethers having carbon atoms from 3 to 12 may also be used, which include, for example, but are not limited to, diisopropyl ether, dimethoxymethane, dimethoxyethane, 1,4-dioxane, 1,3-dioxolane, tetrahydrofuran, anisole and phenetole. Furthermore, cyclic hydrocarbons having from 5 to 8 carbon atoms may be used, which include, for example, but are not limited to, cyclopentane, cyclohexane, cycloheptane and cyclooctane.

Among them, methylene chloride is particularly preferable as a solvent. Methylene chloride may be mixed with other solvents. However, the mixing ratio of methylene chloride is preferably 70% by mass or higher. The solvent is removed at the film-forming step of the cellulose ester film, and the quantity of residual solvent is generally less than 5% by mass. However, the residual quantity is preferably less than 1% by mass, more preferably less than 0.5% by mass.

In addition, considering the influence to human body and environment, the solvent system that does not contain methylene chloride is preferable. In this case, a mixed-solvent including methyl acetate, above-described ketones and alcohols are preferably used. Particularly, when cellulose acylate is selected for the polymer for preparing dope, methyl acetate is preferably used for the main solvent in terms of solubility. Furthermore, methyl acetate may be mixed with solvents such as ketones and alcohols for the purpose of improving the solubility of polymers. Plasticizers, UV-absorbers, antidegradants and the like may also be added to dope.

Plasticizers that can be added to the dope of the present embodiments include, but are not limited to, individually or in combination, phosphates such as triphenyl phosphate, tricresyl phosphate, cresyl diphenyl phosphate, octyl diphenyl phosphate, diphenyl biphenyl phosphate, trioctyl phosphate and tributyl phosphate; phthalates such as diethyl phthalate, dimethoxydiethyl phthalate, dimethyl phthalate and dioctyl phthalate; and glycolates such as triacetin, tributyrin, butyl phthalyl butyl glycolate, ethyl phthalyl ethyl glycolate, methyl phthalyl ethyl glycolate and butyl phthalyl butyl glycolate. Furthermore, plasticizers described in Japanese Patent Laid-Open No. 11-80381, No. 11-124445 and No. 11-248940 may be added. These plasticizers are desirably mixed in the dope in an amount of 0.1 to 20% by mass relative to the cellulose acylate.

In addition, the dope of the present embodiments is preferably added with one or more kinds of UV-absorbers. The UV-absorbers for liquid crystals are preferably excellent in absorbing ultraviolet rays having a wavelength of 370 nm or shorter in terms of preventing degradation of the liquid crystals, and hardly absorbing visible rays having a wavelength of 400 nm or longer in terms of display properties of the liquid crystals.

Preparation of the polymer solution using cellulose triacetate, which is the main raw material of the polymer film of the present embodiments, will now be described.

The cellulose triacetate is first subjected to a swelling step, in which cellulose triacetate particles are mixed with solvent and the cellulose triacetate particles are swelled with the solvent. The swelling step has preferably a temperature of −10 to 55° C., which is typically executed at a room temperature. The ratio of cellulose triacetate to solvent is determined depending on the concentration of the solution finally obtained. Generally, the mixture includes cellulose triacetate preferably in an amount of 5 to 30% by mass, more preferably 8 to 20% by mass and most preferably 10 to 15% by mass. The mixture of cellulose triacetate and solvent is preferably agitated until the cellulose triacetate is adequately swelled. The time of the mixing and agitation is typically 1 to 180 minutes. When cellulose triacetate not only swelled but also dissolved only by mixing and agitation, a step for dissolving cellulose triacetate into solvent such as a heating step, which will be described below, is not necessarily carried out. Other components than solvent and cellulose triacetate, for example, plasticizers, antidegradants, dyes and UV-absorbers may also be added at the swelling step.

Next, the dope is subjected to a heating step in which the dope is heated to 130° C. or above. The heating temperature is 130° C. or higher, preferably 160° C. or higher and most preferably 180° C. or higher. However, a temperature of higher than 250° C. is not preferred, since cellulose triacetate in the dope will start to decompose, resulting in loss of film quality. In the heating step, a heating speed is preferably 1° C./minute or higher, more preferably 2° C./minute or higher, more preferably 4° C./minute or higher and most preferably 8° C./minute or higher. The heating speed is preferably as high as possible, but has a theoretical upper limit of 10000° C./second, a technical upper limit of 1000° C./second and a practical upper limit of 100° C./second. The heating speed is defined by a value obtained by dividing the difference of the temperature at the start of the heating and the finally heated temperature by the time from the start of the heating until the finally heated temperature is reached. The heating method may be any method such as an autoclave system, a multitubular heat exchanger, a screw extruder and a static mixer.

The heating time is preferably from 20 seconds to 4 hours. If the heating time is under 20 seconds, undissolved materials could remain in a heated-dissolved dope, preventing preparation of a high quality film. When the undissolved materials are to be removed, the filter life will extremely be shortened. The starting point of the heating time shall be measured from the time when a target temperature is reached, and the end point shall be the time when cooling is started from a target temperature. The cooling of the device may be natural cooling or forced cooling.

In the heating step, the dope is preferably heated to a temperature of the boiling point at atmospheric pressure of the solvent or above under a pressure adjusted so as to prevent the solution from boiling. Applying pressure prevents the dope from foaming, thereby providing a uniform dope. The pressure to be applied is selected from the relation between the heating temperature and the boiling point of the solvent.

Cooling of the dope prior to the heating step causes solvent to rapidly and effectively permeate into cellulose triacetate to facilitate dissolution, thereby providing a film having good optical properties. Regarding a system being difficult to dissolve at room temperatures and a system generating an increased amount of undissolved materials, good dope can be prepared by cooling or heating or by combination of both. The effective temperature condition is from minus 100° C. to minus 10° C. In the cooling step, a closed container is desirably used to avoid water contamination due to condensation during the cooling. The time required for cooling can be decreased by reducing pressure during the cooling. A pressure-resistant container is desirably used for carrying out the pressure reduction. The cooling step is also effectively carried out when executed after the heating step. If the dissolution is insufficient, the process from cooling to heating may be carried out repeatedly. The adequacy of the dissolution can be determined by visually observing the appearance of the solution.

When two or more kinds of dopes are prepared and co-cast in the solution film-forming method of the present embodiments, for example, when a film having a three-layered structure is formed, a film having good planarity, transparency or fabrication properties can be formed by containing more cellulose triacetate in the dope for the inside layer and less cellulose triacetate in the dopes for the outside layers formed on top and bottom surfaces of the inside layer, but the preparation of the dope is not limited to the above.

A casting die for casting on a casting band or a casting drum which is a support, will now be described.

FIGS. 3 to 7 illustrate a flat die used for forming a film.

Figure 3:
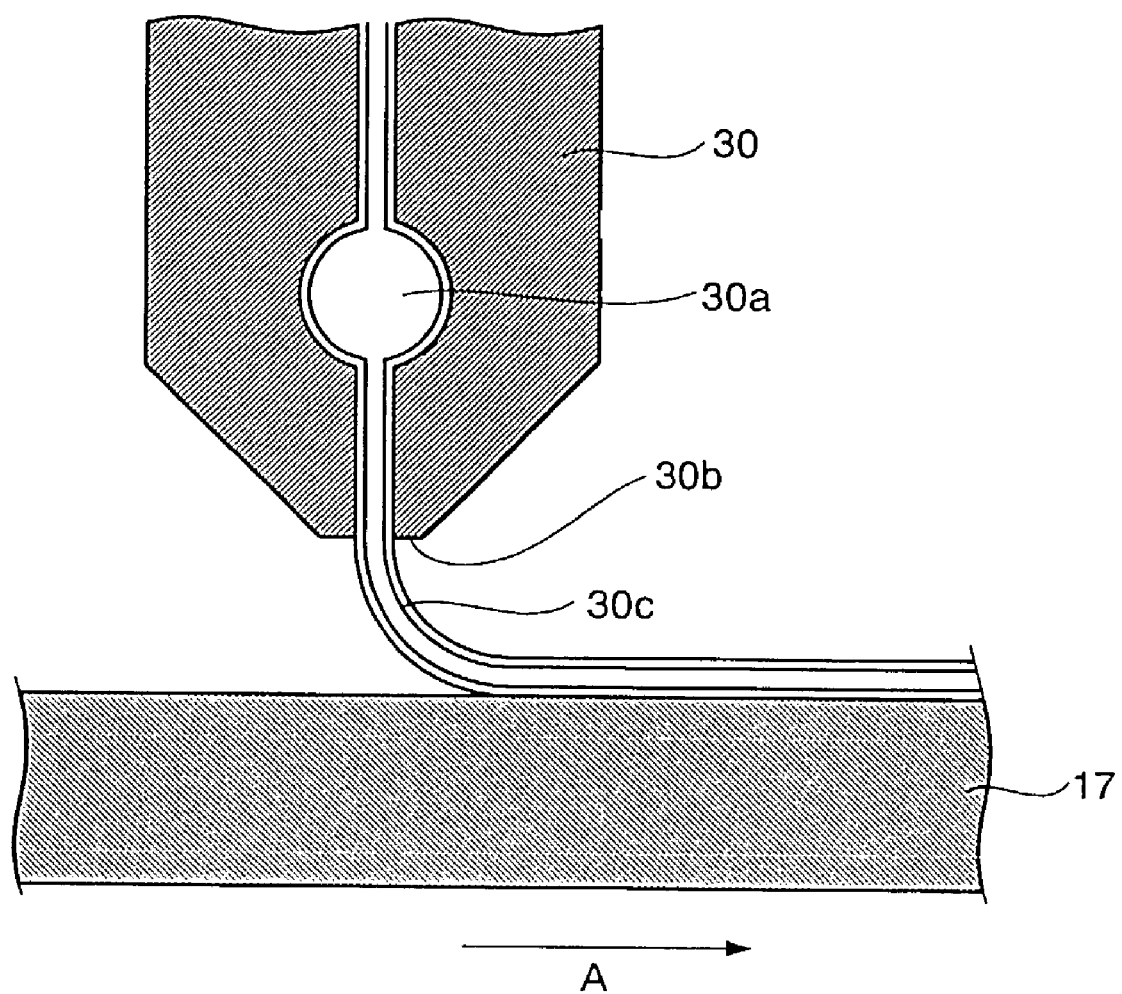
FIG. 3 illustrates a manifold die.
Figure 4:
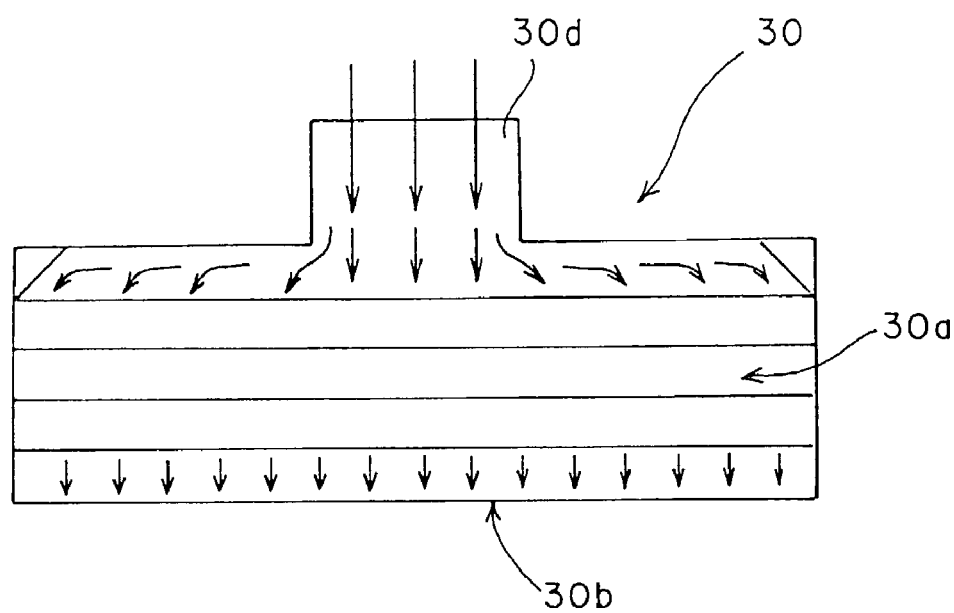
FIG. 4 illustrates an exploded plan view of a manifold die.
Figure 5:
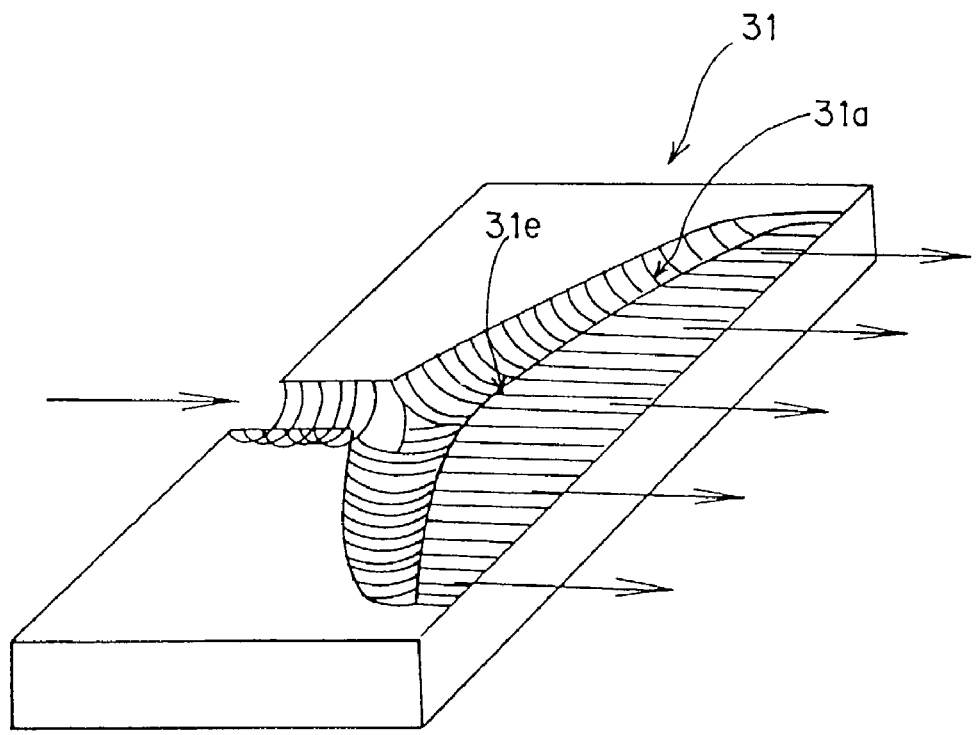
FIG. 5 illustrates an exploded plan view of a coat hunger die.

A manifold die 30 shown in FIG. 3 is provided with a manifold 30a in which a polymer solution is temporarily held so as to ensure a pressure for discharging the polymer solution on a casting band 17 is uniform in the transverse direction of a film. The polymer solution having a uniform pressure in the manifold 30a is discharged from die lips 30b and cast on the casting band 17 as a ribbon-form polymer solution 30c. As indicated in an exploded plan view of the manifold die 30 shown in FIG. 4, the manifold 30a having a cylindrical shape is provided parallel to the die lips 30b. The polymer solution is supplied from a central supply hole 30d. The length of the flow of the polymer solution from the supply hole 30d to the central part of the die lips 30b is considerably different from the length to both ends of the die lips 30b. Therefore, the manifold 30a of a specific size is provided to ensure uniform discharge from the die lips 30b. The manifold 31a of a coat hunger die 31 whose exploded plan view is shown in FIG. 5 is not so large as the manifold 30a of the manifold die 30, but it extends in a fan having a wide angle, so that the manifold 31a has a fan shape 31e like a fish tail to maintain the uniformity of the discharged film thickness.

The manifold die 30 preferably has a gap of the die lips 30b set from 0.4 mm to 2.0 mm.

Figure 6:
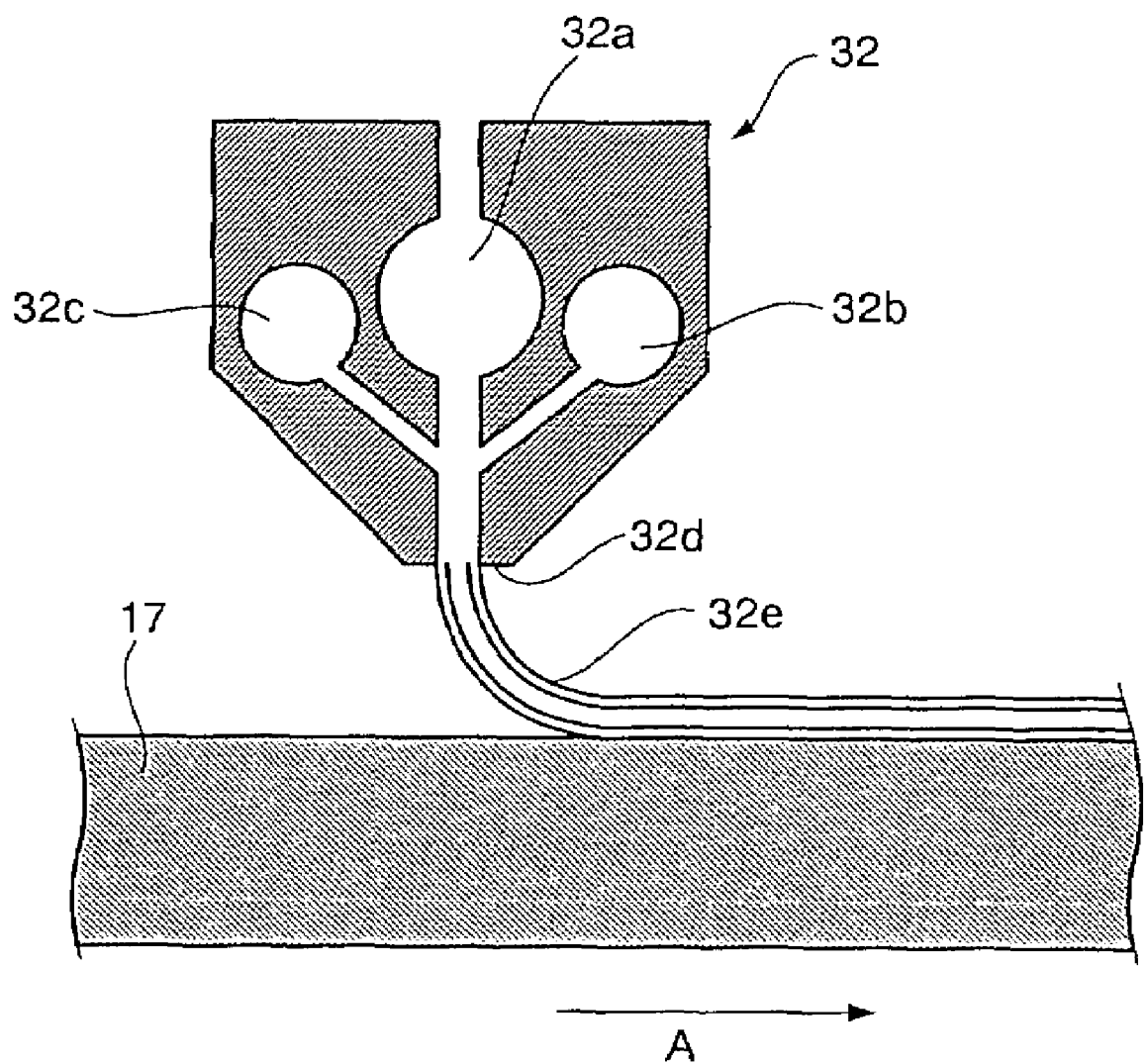
FIG. 6 illustrates a multi-manifold-type co-casting die.

The casting die shown in FIG. 6 is a multi-manifold-type co-casting die 32 having three manifolds 32a, 32b and 32c and used for forming a multi-layered film. The polymer solution combined in three layers from the three manifolds 32a, 32b and 32c is discharged from die lips 32d and cast on the casting belt 17 as a ribbon-form polymer solution 32e to form a film having three-layered structure.

The multi-manifold-type co-casting die 32 preferably has a gap of the die lips 32d set from 0.4 mm to 2.0 mm.

Figure 7:
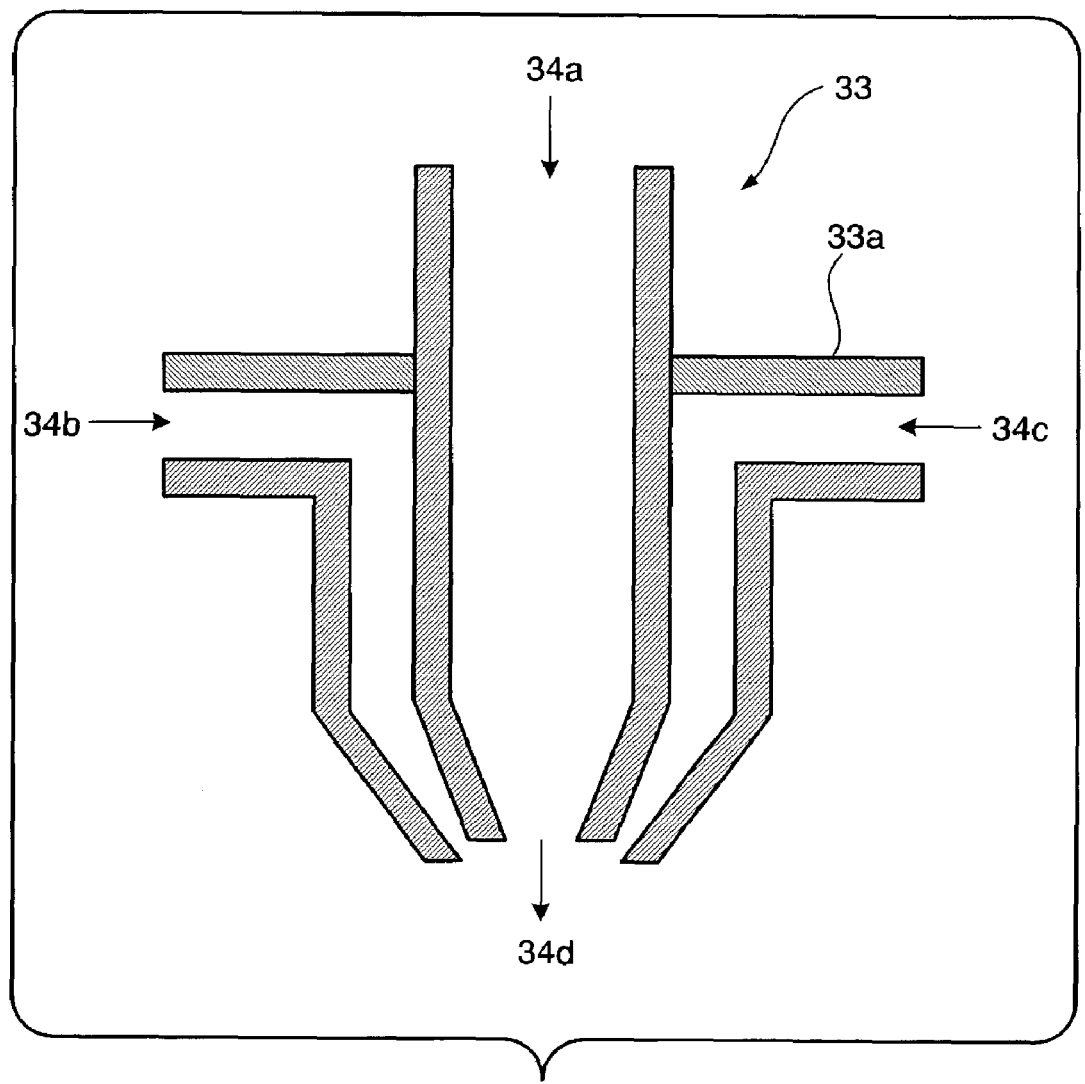
FIG. 7 illustrates a feed block-type co-casting die.

The casting die shown in FIG. 7 is a feed block-type co-casting die 33 provided with a feed block 33a. A polymer solution for multiple layers 34d combining a polymer solution for surface layer 34b, a polymer solution for back layer 34c and a polymer solution for intermediate layer 34a fed from the feed block 33a is to be cast further through the manifold die 30 shown in FIG. 3.

Figure 8:
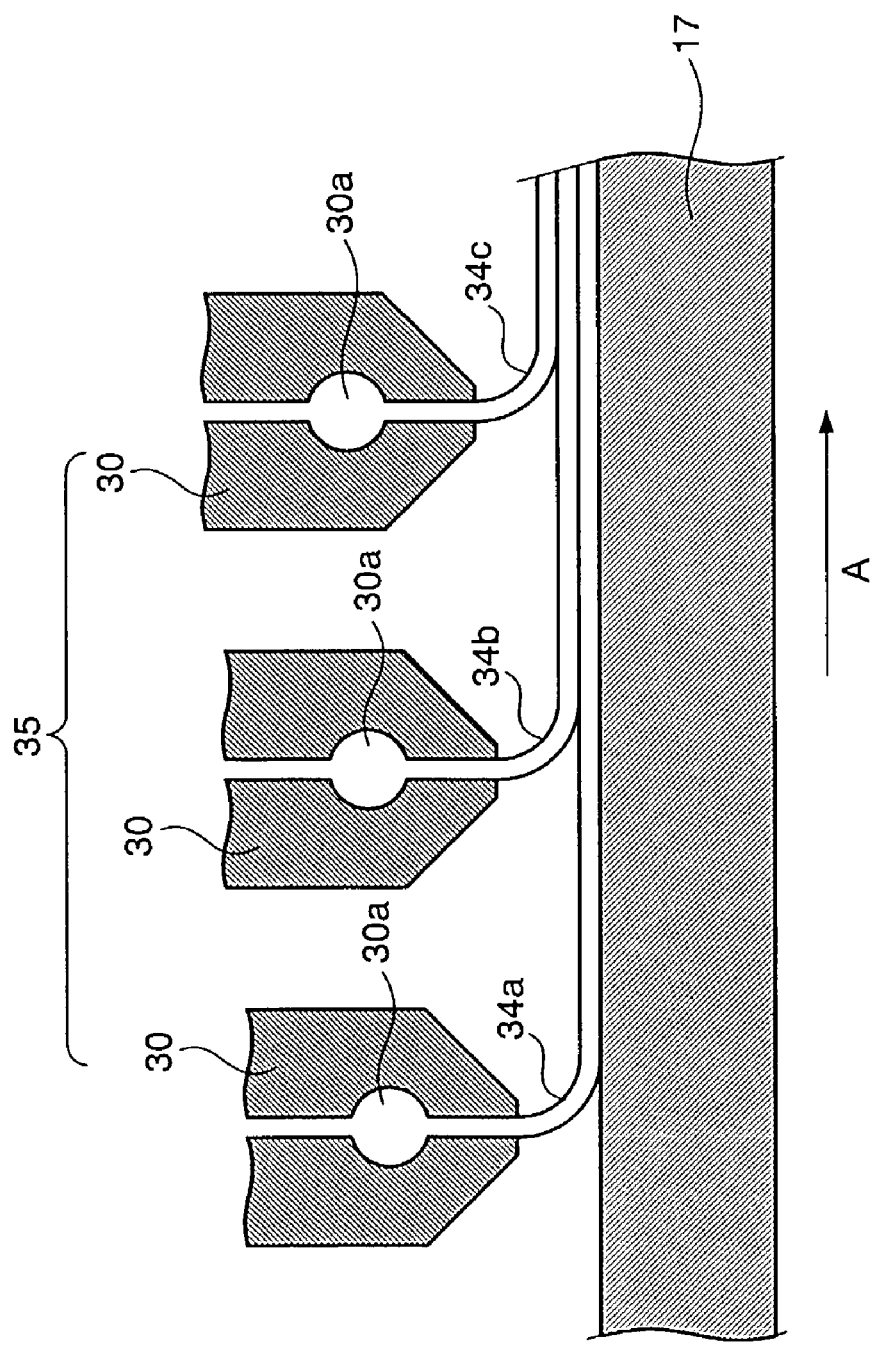
FIG. 8 illustrates a serial-casting die.

The casting die shown in FIG. 8 is serial-casting dies 35 in which three manifold dies 30 shown in FIG. 3 are disposed in three positions shifted with small distances in the running direction of a casting belt 17 indicated by the arrow A. A polymer solution for back layer 34c, a polymer solution for intermediate layer 34a and a polymer solution for surface layer 34b are cast on the casting belt from the respective manifold dies 30 in this order from the upstream side in the direction of the arrow A.

The clearance between a casting die and a support (a casting band or a casting drum) is set typically in the range of from 1 mm to 10 mm, preferably in the range of from 1.5 mm to 6 mm, but not limited to the above.

The applications of the obtained polymer film will now be described.

The obtained polymer film can be used for a protective film of polarizing plate. The polarizing plate can be formed by applying the protective film of polarizing plate on both surfaces of a polarizing element formed of polyvinyl alcohol or the like. In addition, the polymer film can also be used for an optical compensation film in which the polymer film is applied on an optical compensation sheet, and for an optical functional film such as an anti-reflection film in which an antiglare layer is laminated on the polymer film. Furthermore, a part of a liquid crystal display device can be constituted by using these products.

EXAMPLES

Examples of polymer solutions will now be described.

Polymer films were formed using the solution film-forming method of the present embodiments by changing basic conditions such as layer construction, film-forming speed and film thickness, and by changing the composition (of a basic layer, a surface layer or a back layer), dynamic coefficient of viscosity and dynamic modulus of rigidity/dynamic coefficient of viscosity (n) of the polymer solution. The polymer films were served for evaluation of the surface condition of the film, and also the presence or absence of unpeeled leavings while the films were peeled from the casting drum or belt was checked.

In addition, for comparison, the films formed using the polymer solutions having dynamic coefficient of viscosity or dynamic modulus of rigidity/dynamic coefficient of viscosity (n) outside the conditions set in the present embodiments were similarly evaluated as Comparative Examples.

The evaluation of the surface condition of polymer films were carried out by changing angles with reflected light and transmitted light of fluorescent lighting. A sensory evaluation was made with the following standards on the state of unevenness of a film surface caused by nonuniform thickness of the film and the presence and absence of scratches.

No unevenness and no scratches: E
No scratches and some weak unevenness: G
Some weak unevenness and fine scratches: M
Strong unevenness or scratches: P Dynamic modulus of rigidity and dynamic coefficient of viscosity were measured with a stress-control rheometer CSL 500 type (manufactured by I. T. S.) at a measuring temperature of 35° C., with a cone (a diameter of 4 cm, 2°), at a frequency of 1 Hz and at a displacement of 2%.

Example 1

(Basic Conditions)
Film-forming speed: 60 m/minute, Thickness of film product: 80 μm, Layer construction: Single-layer
Support temperature: minus 5° C., Temperature of casting die: 35° C.

(Composition and Physical Properties)

[Basic Layer]
cellulose triacetate: 87.0 parts by mass
triphenyl phosphate: 6.8 parts by mass
biphenyl diphenyl phosphate: 3.4 parts by mass
methylene chloride: 300.0 parts by mass
methanol: 65.0 parts by mass
n-butanol: 7.0 parts by mass
UV-absorber: 0.9 part by mass
dynamic coefficient of viscosity (Pascal·second) n: 78
dynamic modulus of rigidity (Pascal) E1: 140
E1/n: 1.79

[Common]
minimum dynamic modulus of rigidity in film layer (Pascal): 82000

(Evaluation Result of Surface Condition) G

Example 2

(Basic Conditions)
Film-forming speed: 45 m/minute, Thickness of film product: 40 μm, Layer construction: Single-layer
Support temperature: minus 5° C., Temperature of casting die: 35° C.

(Composition and Physical Properties)

[Basic Layer]
cellulose triacetate: 87.0 parts by mass
triphenyl phosphate: 6.8 parts by mass
biphenyl diphenyl phosphate: 3.4 parts by mass
methylene chloride: 300.0 parts by mass
methanol: 65.0 parts by mass
n-butanol: 7.0 parts by mass
UV-absorber: 0.9 part by mass
dynamic coefficient of viscosity (Pascal·second) n: 78
dynamic modulus of rigidity (Pascal) E1: 140
E1/n:1.79

[Common]
minimum dynamic modulus of rigidity in film layer (Pascal): 82000

(Evaluation Result of Surface Condition) G

Example 3

(Basic Conditions)
Film-forming speed: 45 m/minute, Thickness of film product: 40 μm, Layer construction: Two layers
Thickness of surface layer: 0, Thickness of back layer: 3 μm
Support temperature: minus 5° C., Temperature of casting die: 35° C.

(Composition and Physical Properties)

[Basic Layer]
cellulose triacetate: 100 parts by mass
triphenyl phosphate: 7.8 parts by mass
biphenyl diphenyl phosphate: 3.9 parts by mass
methylene chloride: 300.0 parts by mass
methanol: 65.0 parts by mass
n-butanol: 7.0 parts by mass
UV-absorber: 1.0 part by mass
dynamic coefficient of viscosity (Pascal·second) n: 106
dynamic modulus of rigidity (Pascal) E1: 233
E1/n: 2.20

[Surface Layer or Back Layer (Support Side)]
cellulose riacetate : 87.0 parts by mass
triphenyl phosphate: 6.8 parts by mass
biphenyl diphenyl phosphate: 3.4 parts by mass
methylene chloride: 300.0 parts by mass
methanol: 65.0 parts by mass
n-butanol: 7.0 parts by mass
UV-absorber: 0.9 part by mass
dynamic coefficient of viscosity (Pascal·second) n: 78
dynamic modulus of rigidity (Pascal) E1: 140
E1/n: 1.79

[Common]
minimum dynamic modulus of rigidity in film layer (Pascal): 125000

(Evaluation Result of Surface Condition) E

Example 4

(Basic Conditions)

Film-forming speed: 80 m/minute, Thickness of film product: 80 μm, Layer construction: Three layers Thickness of surface layer: 3 μm, Thickness of back layer: 3 μm Support temperature: minus 5° C., Temperature of casting die: 35° C.

(Composition and Physical Properties)

[Basic Layer]
cellulose triacetate: 100 parts by mass
triphenyl phosphate: 7.8 parts by mass
biphenyl diphenyl phosphate: 3.9 parts by mass
methylene chloride: 300.0 parts by mass
methanol: 65.0 parts by mass
n-butanol: 7.0 parts by mass
UV-absorber: 1.0 part by mass
dynamic coefficient of viscosity (Pascal·second) n: 106
dynamic modulus of rigidity (Pascal) E1: 233
E1/n: 2.20

[Surface Layer or Back Layer (Support Side)]
cellulose triacetate: 87.0 parts by mass
triphenyl phosphate: 6.8 parts by mass
biphenyl diphenyl phosphate: 3.4 parts by mass
methylene chloride: 300.0 parts by mass
methanol: 65.0 parts by mass
n-butanol: 7.0 parts by mass
UV-absorber: 0.9 part by mass
dynamic coefficient of viscosity (Pascal·second) n: 78
dynamic modulus of rigidity (Pascal) E1: 140
E1/n: 1.79

[Common]
minimum dynamic modulus of rigidity in film layer (Pascal): 83000

(Evaluation Result of Surface Condition) E

Example 5

(Basic Conditions)

Film-forming speed: 100 m/minute, Thickness of film product: 80 μm, Layer construction: Three layers Thickness of surface layer: 3 μm, Thickness of back layer: 3 μm Support temperature: minus 5° C., Temperature of casting die: 35° C.

(Composition and Physical Properties)

[Basic Layer]
cellulose triacetate: 100 parts by mass
triphenyl phosphate: 7.8 parts by mass
biphenyl diphenyl phosphate: 3.9 parts by mass
methylene chloride: 300.0 parts by mass
methanol: 65.0 parts by mass
n-butanol: 7.0 parts by mass
UV-absorber: 1.0 part by mass
dynamic coefficient of viscosity (Pascal·second) n: 106
dynamic modulus of rigidity (Pascal) E1: 233
E1/n: 2.20

[Surface Layer or Back Layer (Support Side)]
cellulose triacetate: 77.0 parts by mass
triphenyl phosphate: 6.0 parts by mass
biphenyl diphenyl phosphate: 3.0 parts by mass
methylene chloride: 300.0 parts by mass
methanol: 65.0 parts by mass
n-butanol: 7.0 parts by mass
UV-absorber: 0.9 part by mass
dynamic coefficient of viscosity (Pascal·second) n: 55
dynamic modulus of rigidity (Pascal) E1: 83
E1/n: 1.51

[Common]
minimum dynamic modulus of rigidity in film layer (Pascal): 50200

(Evaluation Result of Surface Condition) E

Example 6

(Basic Conditions)

Film-forming speed: 60 m/minute, Thickness of film product: 40 μm, Layer construction: Three layers Thickness of surface layer: 3 μm, Thickness of back layer: 3 μm Support temperature: minus 5° C., Temperature of casting die: 35° C.

(Composition and Physical Properties)

[Basic Layer]
cellulose triacetate: 100 parts by mass
triphenyl phosphate: 7.8 parts by mass
biphenyl diphenyl phosphate: 3.9 parts by mass
methylene chloride: 300.0 parts by mass
methanol: 65.0 parts by mass
n-butanol: 7.0 parts by mass
UV-absorber: 1.0 part by mass
dynamic coefficient of viscosity (Pascal·second) n: 106
dynamic modulus of rigidity (Pascal) E1: 233
E1/n: 2.20

[Surface Layer or Back Layer (Support Side)]
cellulose riacetate : 77.0 parts by mass
triphenyl phosphate: 6.0 parts by mass
biphenyl diphenyl phosphate: 3.0 parts by mass
methylene chloride: 300.0 parts by mass
methanol: 65.0 parts by mass
n-butanol: 7.0 parts by mass
UV-absorber: 0.9 part by mass
dynamic coefficient of viscosity (Pascal·second) n: 55
dynamic modulus of rigidity (Pascal) E1: 83
E1/n: 1.51

[Common]
minimum dynamic modulus of rigidity in film layer (Pascal): 50200

(Evaluation Result of Surface Condition) E

Comparative Example 1

(Basic Conditions)

Film-forming speed: 60 m/minute, Thickness of film product: 80 μm, Layer construction: Single-layer Support temperature: minus 5° C., Temperature of casting die: 35° C.

(Composition and Physical Properties)

[Basic Layer]
cellulose triacetate: 100 parts by mass
triphenyl phosphate: 7.8 parts by mass
biphenyl diphenyl phosphate: 3.9 parts by mass methylene chloride: 272.0 parts by mass
methanol: 93.0 parts by mass
n-butanol: 7.0 parts by mass
UV-absorber: 1.0 part by mass
dynamic coefficient of viscosity (Pascal·second) n: 88
dynamic modulus of rigidity (Pascal) E1: 318
E1/n: 3.61

[Common]
minimum dynamic modulus of rigidity in film layer (Pascal): 190000

(Evaluation Result of Surface Condition) P

Comparative Example 2

(Basic Conditions)
Film-forming speed: 60 m/minute, Thickness of film product: 80 μm, Layer construction: Three layers
Thickness of surface layer: 3 μm, Thickness of back layer: 3 μm
Support temperature: minus 5° C., Temperature of casting die: 35° C.

(Composition and Physical Properties)

[Basic Layer]
cellulose triacetate: 100 parts by mass
triphenyl phosphate: 7.8 parts by mass
biphenyl diphenyl phosphate: 3.9 parts by mass
methylene chloride: 272.0 parts by mass
methanol: 93.0 parts by mass
n-butanol: 7.0 parts by mass
UV-absorber: 1.0 part by mass
dynamic coefficient of viscosity (Pascal·second) n: 88
dynamic modulus of rigidity (Pascal) E1: 318
E1/n: 3.61

[Surface Layer or Back Layer (Support Side)]
cellulose triacetate: 100.0 parts by mass
triphenyl phosphate: 7.8 parts by mass
biphenyl diphenyl phosphate: 3.9 parts by mass
methylene chloride: 279.0 parts by mass
methanol: 85.0 parts by mass
n-butanol: 7.0 parts by mass
UV-absorber: 1.0 part by mass
dynamic coefficient of viscosity (Pascal·second) n: 99
dynamic modulus of rigidity (Pascal) E1: 302
E1/n: 3.05

[Common]
minimum dynamic modulus of rigidity in film layer (Pascal): 145800

(Evaluation Result of Surface Condition) M

Comparative Example 3

(Basic Conditions)
Film-forming speed: 60 m/minute, Thickness of film product: 80 μm, Layer construction: Three layers
Thickness of surface layer: 3 μm, Thickness of back layer: 3 μm
Support temperature: minus 5° C., Temperature of casting die: 35° C.

(Composition and Physical Properties)

[Basic Layer]
cellulose triacetate: 100 parts by mass
triphenyl phosphate: 7.8 parts by mass
biphenyl diphenyl phosphate: 3.9 parts by mass
methylene chloride: 272.0 parts by mass
methanol: 93.0 parts by mass
n-butanol: 7.0 parts by mass
UV-absorber: 1.0 part by mass
dynamic coefficient of viscosity (Pascal·second) n: 88
dynamic modulus of rigidity (Pascal) E1: 318
E1/n: 3.61

[Surface Layer or Back Layer (Support Side)]
cellulose triacetate: 58.0 parts by mass
triphenyl phosphate: 4.5 parts by mass
biphenyl diphenyl phosphate: 2.3 parts by mass
methylene chloride: 300.0 parts by mass
methanol: 65.0 parts by mass
n-butanol: 7.0 parts by mass
UV-absorber: 0.7 part by mass
dynamic coefficient of viscosity (Pascal·second) n: 18
dynamic modulus of rigidity (Pascal) E1: 25
E1/n: 1.39

[Common]
minimum dynamic modulus of rigidity in film layer (Pascal): 19000

(Evaluation Result of Surface Condition) P (Due to Unpeeled Leavings)
Unpeeled leavings upon peeling the film from the support was checked in each of the above described Examples and Comparative Examples. The unpeeled leavings did not occur in Examples 1 to 6 and Comparative Examples 1 and 2, but it occurred in Comparative Example 3.

Based upon the above results, it was possible to verify that a polymer film having a good surface condition could be formed by casting on a support a polymer solution set such that E1/n is larger than 0.1 (1/second) and smaller than 3.0 (1/second). It was also verified that unpeeled leavings did not occur if the film has a dynamic modulus of rigidity of 20 (Pascal·second) or larger.

What is claimed is:

1. A method for obtaining a polymer film, comprising:
providing a film-forming device, comprising:
a dope supply device containing a prepared dope;
a poor solvent supply device containing a poor solvent;
a mixer connected to both the dope supply device and the poor solvent supply device; and
a casting die connected to the mixer;
preparing a polymer solution by mixing a certain amount of poor solvent from the poor solvent supply device with the prepared dope from the dope supply device in the mixer;
delivering the polymer solution from the mixer to the casting die;
pressurizing and discharging the polymer solution from the casting die;
casting the polymer solution on a support;
solidifying the polymer solution to form a film on the support;
peeling the film from the support; and
drying the film,
wherein the poor solvent is mixed with the prepared dope such that the polymer solution has a ratio of dynamic modulus of rigidity to dynamic coefficient of viscosity of 0.1 to 3.0 (1/second) prior to discharging the polymer solution from the casting die.

2. The method according to claim 1, wherein the poor solvent is mixed with the prepared dope such that the polymer solution to be cast on the support has a dynamic coefficient of viscosity higher than 20 (Pascal·second) and lower than 200 (Pascal·second).

3. The method according to claim 1, wherein the polymer solution is prepared within ten minutes prior to being discharged from the casting die.

4. The method according to claim 1, wherein the polymer solution is prepared by mixing the poor solvent with the prepared dope with a static mixer.

5. The method according to claim 1, wherein the polymer solution is delivered to the casting die under pressure through piping, the highest pressure in the piping being from 5 (kg/cm$^2$) to 40 (kg/cm$^2$).

6. The method according to claim 1, comprising a cocasting step for discharging two or more kinds of polymer solutions to be cast on the support after the polymer solutions are combined, or a serial-casting step for discharging the polymer solutions to be cast on the support by displacing the positions of the discharge, wherein among the two or more kinds of polymer solutions, the polymer solution or solutions forming a back layer in contact with the support, or the back layer and a surface layer opposite to the back layer, when discharged to be cast on the support, are the polymer solution or solutions prepared by mixing the poor solvent to the prepared dope.

7. The method according to claim 2, comprising a co-casting step for discharging two or more kinds of polymer solutions to be cast on the support after the polymer solutions are combined, or a serial-casting step for discharging the polymer solutions to be cast on the support by displacing the positions of the discharge, wherein among the two or more kinds of polymer solutions, the polymer solution or solutions forming a back layer in contact with the support, or the back layer and a surface layer opposite to the back layer, when discharged to be cast on the support, are the polymer solution or solutions prepared by mixing the poor solvent to the prepared dope.

8. The method according to claim 3, comprising a co-casting step for discharging two or more kinds of polymer solutions to be cast on the support after the polymer solutions are combined, or a serial-casting step for discharging the polymer solutions to be cast on the support by displacing the positions of the discharge, wherein among the two or more kinds of polymer solutions, the polymer solution or solutions forming a back layer in contact with the support, or the back layer and a surface layer opposite to the back layer, when discharged to be cast on the support, are the polymer solution or solutions prepared by mixing the poor solvent to the prepared dope.

9. The method according to claim 4, comprising a co-casting step for discharging two or more kinds of polymer solutions to be cast on the support after the polymer solutions are combined, or a serial-casting step for discharging the polymer solutions to be cast on the support by displacing the positions of the discharge, wherein among the two or more kinds of polymer solutions, the polymer solution or solutions forming a back layer in contact with the support, or the back layer and a surface layer opposite to the back layer, when discharged to be cast on the support, are the polymer solution or solutions prepared by mixing the poor solvent to the prepared dope.

10. The method according to claim 5, comprising a co-casting step for discharging two or more kinds of polymer solutions to be cast on the support after the polymer solutions are combined, or a serial-casting step for discharging the polymer solutions to be cast on the support by displacing the positions of the discharge, wherein among the two or more kinds of polymer solutions, the polymer solution or solutions forming a back layer in contact with the support, or the back layer and a surface layer opposite to the back layer, when discharged to be cast on the support, are the polymer solution or solutions prepared by mixing the poor solvent to the prepared dope.

11. The method according to claim 1, wherein the dynamic modulus of rigidity of the film when the film is peeled from the support is higher than 20,000 (Pascal).

12. The method according to claim 1, wherein the temperature difference between the temperature of the casting die when discharging the polymer solution from the casting die on the support and the temperature of the support when the film solidified on the support is peeled from the support is higher than 5° C. and lower than 50° C.

13. The method according to claim 1, wherein the temperature of the polymer solution when discharging the polymer solution on the support from the casting die is from 10° C. to 55° C.

14. The method according to claim 1, wherein the temperature of the support when peeling the solidified film from the support is from minus 30° C. to 30° C.

15. The method according to claim 1, wherein the casting die has a lip gap of 0.4 mm to 2.0 mm.

* * * * *